United States Patent

[11] 3,540,590

| [72] | Inventors | Thomas E. Schneider, Jr. <br> Atlanta; <br> William E. Bradley, Jr., Smyrna, Georgia |
|---|---|---|
| [21] | Appl. No. | 784,673 |
| [22] | Filed | Dec. 18, 1968 |
| [45] | Patented | Nov. 17, 1970 |
| [73] | Assignee | Tesco Chemicals, Inc. <br> Atlanta, Georgia <br> a corporation of Georgia |

[54] WASTE TREATMENT APPARATUS
8 Claims, 6 Drawing Figs.

[52] U.S. Cl. .................................................. 210/152,
  4/10, 4/90, 4/115; 23/267, 137/268, 210/198
[51] Int. Cl. ............................................... C02c 1/40
[50] Field of Search ......................................... 210/59, 62,
  152, 198, 199, 169, 153; 23/267, 272, 272.2,
  272.4, 272.6, 272.7; 137/268; 4/115, 10, 90

[56] References Cited
UNITED STATES PATENTS

| 2,553,977 | 5/1951 | Mau .......................... | 137/268X |
| 2,802,724 | 8/1957 | Johnson .................... | 137/268X |
| 3,145,087 | 8/1964 | Walker ...................... | 137/268X |
| 3,323,539 | 6/1967 | Scneider et al. ........... | 137/268 |
| 3,446,356 | 5/1969 | May .......................... | 210/152X |

*Primary Examiner*—Michael E. Rogers
*Attorney*—Jones and Thomas

ABSTRACT: A waste treatment method and apparatus in which the method includes flowing liquid into the upper portion of a waste receptacle, washing the waste in a downward direction within the receptacle, grinding the waste into small particles, and discharging the waste and the liquid. A purifying chemical is added to the liquid prior to its entry into the waste receptacle, The apparatus includes a chemical mixing device which comprises a container for receiving a solid stick of soluble chemical compound in an upright attitude, and which defines a series of apertures at its lower end. A source of liquid is communicated to the outside surface of the container about the apertures, and a pump inlet communicates with the interior portion of the container, to reduce the pressure within the container and to induce liquid to flow through the apertures and impinge upon and erode the lower end of the chemical stick, and then pass to the pump.

INVENTORS.
Thomas E. Schneider, Jr.
BY William E. Bradley, Jr.

Jones & Thomas
ATTORNEYS

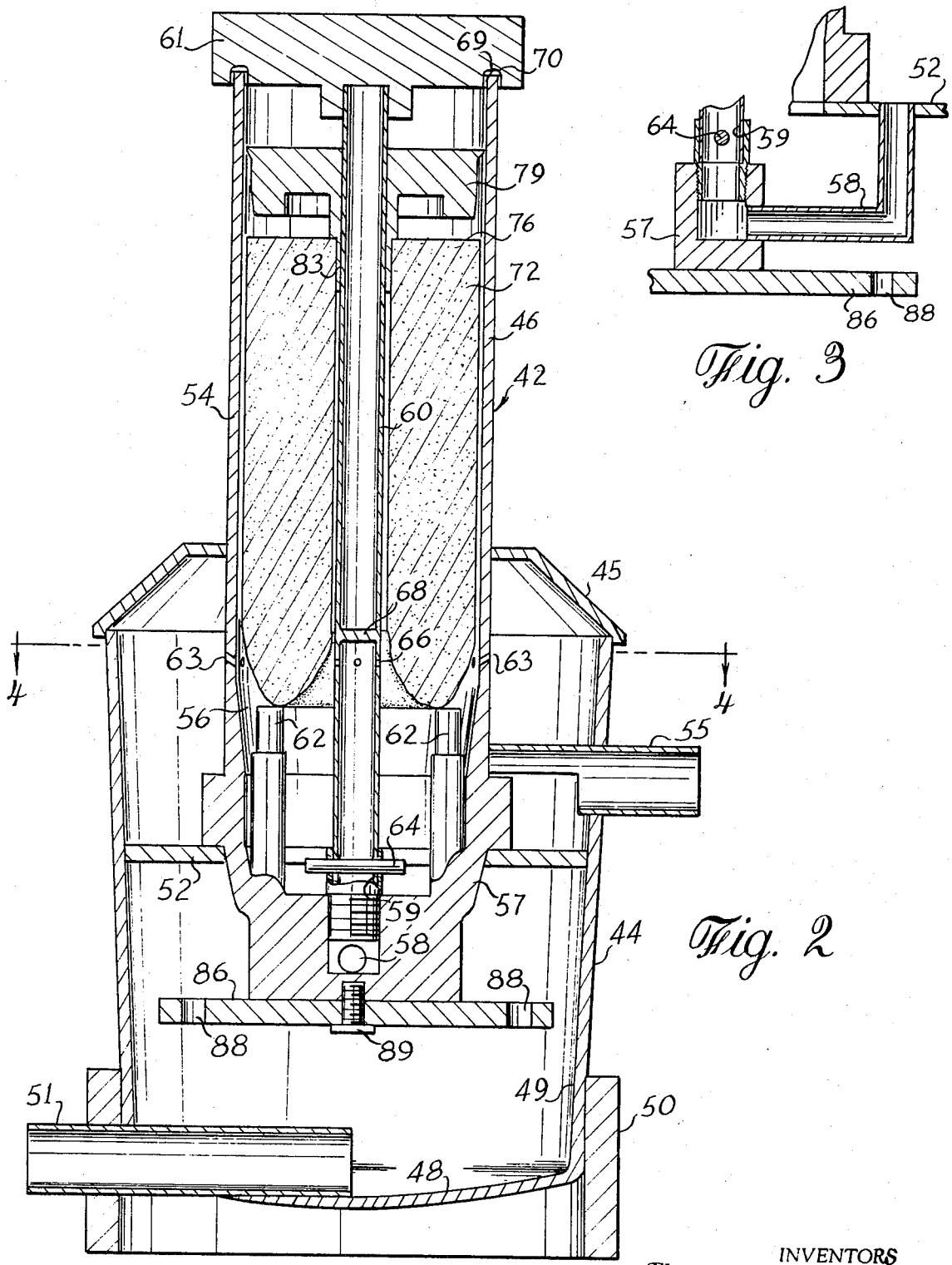

WASTE TREATMENT APPARATUS

BACKGROUND OF THE INVENTION

When waste is discharged from a marine commode system, it is usually pumped overboard into the water adjacent the boat or ship. If the boat is a long distance from the shore, the presence of the waste in the water may present no problem since the waste may disperse and decay before it reaches the shore or other location where it might contaminate the water and otherwise be harmful. When the boat is closer to the shore, as when passing adjacent the shore line or when docked, the waste exhausted from the boat may be a pollution hazard. Of course, the pollution hazard is increased when a large number of boats are tied up or anchored in one area.

In order to reduce or eliminate water pollution from the discharge of waste from boats and the like, various chemicals have been mixed with the waste prior to its being discharged overboard. A typical system includes the process of flowing water from under the boat toward a commode, mixing liquid chlorine with the water, and flowing the mixture through the commode. The waste is purged from the commode to a macerator so that it is reduced into small sizes, and then the mixture is discharged overboard. In order to properly utilize liquid chlorine in such a system, it is necessary to provide a metering device to control the flow of liquid chlorine into the stream of purging water, and to provide a liquid chlorine container. The container of liquid chlorine must be carefully stored and delicately handled when being connected to the commode. Because of the nature of the chemical involved, the equipment utilized to mix the liquid chlorine with the purging water must be frequently and carefully inspected to determine if it is operating properly, since the equipment is subject to clogging. Also, the supply of liquid chlorine in the commode system is subject to depletion without notice, and the chlorine supply must be frequently inspected.

SUMMARY OF THE INVENTION

Briefly described, the present invention comprises a waste treatment method and apparatus which utilizes a solid form of soluble chemical compound which is eroded or dissipated by the flow of purging liquid toward the waste receptacle. The solid chemical compound is sized and shaped so that it is easily handled and when placed in the commode system it is suspended in a position so that the purging liquid makes contact with and dissipates the chemical compound only when the purging liquid is flowing toward the waste receptacle. At all other times the solid chemical compound is not contacted by the purging liquid, so that the chemical compound does not dissolve and is not otherwise dissipated or contaminated by the purging liquid, even when left standing for prolonged periods of time.

Thus, it is an object of this invention to provide a waste treatment method and apparatus which mixes a purifying chemical with the purging liquid of a commode system without the necessity of handling liquid chemicals.

Another object of this invention is to provide a waste treatment method and apparatus which functions virtually without danger of dissipation of the chemical supply or otherwise malfunctioning.

Another object of this invention is to provide a chemical mixing apparatus for mixing a chemical with a liquid and which terminates the flow of liquid when the chemical has been dissipated.

Another object of this invention is to provide a marine commode system which is inexpensive to manufacture, economical and expedient in operation, and which safely discharges waste from a boat without danger of polluting the water adjacent the boat.

Other objects, features and advantages of the present invention will become apparent upon reading the following specification, when taken in conjunction with the accompanying drawing.

BRIEF DESCRIPTION OF THE DRAWING

FIG. 2 is a side elevational view, in cross section, of the chemical mixing apparatus.

FIG. 3 is a detail showing of the internal liquid supply conduit and its related components.

DESCRIPTION OF THE PREFERRED EMBODIMENT

Figure 1:
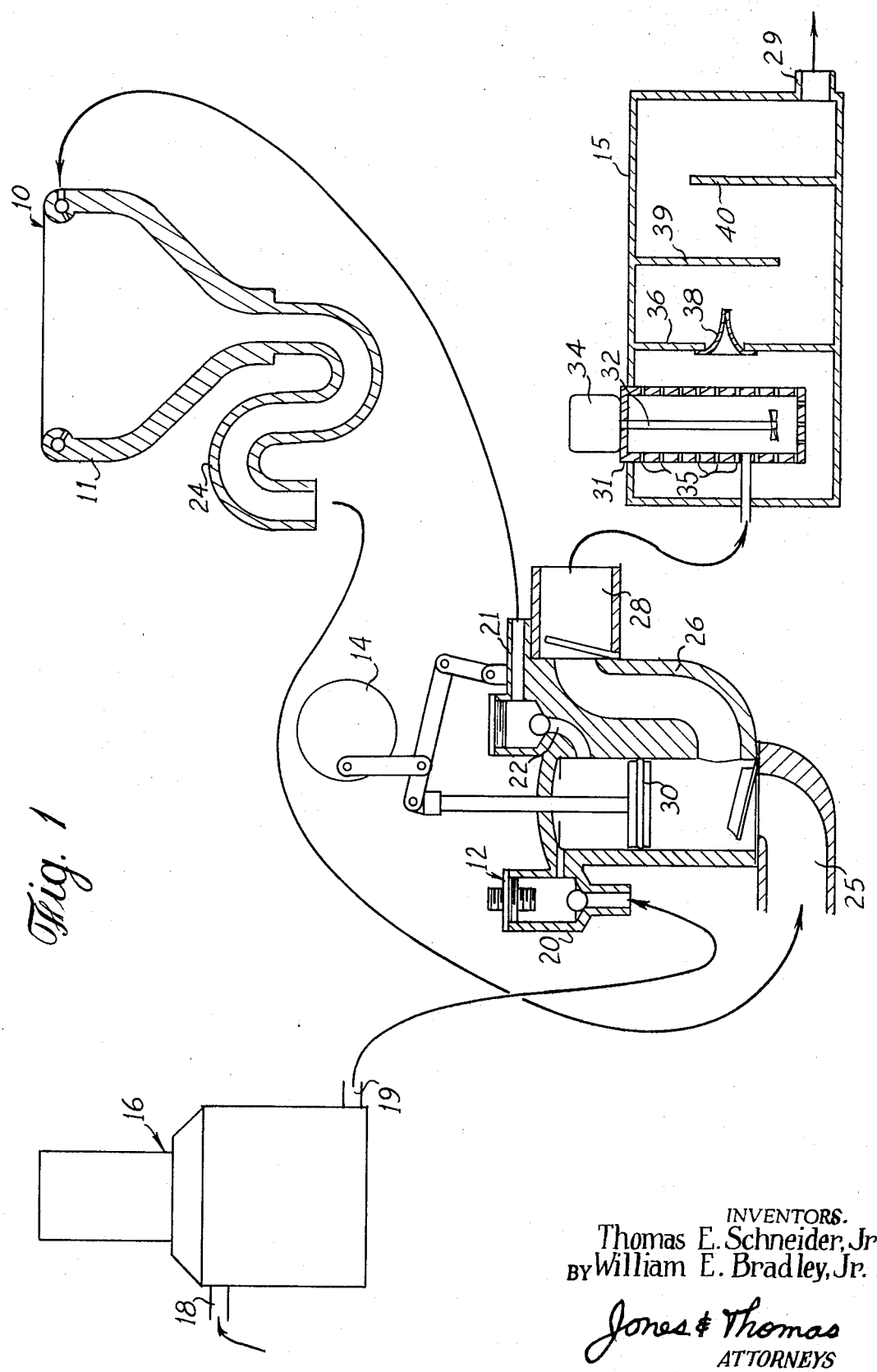
FIG. 1 is a schematic view of a marine commode system.

Referring now more particularly to the drawing, in which like numerals indicate like parts throughout the several views, FIG. 1 shows marine commode system 10 which includes waste receptacle 11, double-acting piston pump 12, its motor 14, retention tank 15, and chemical mixing apparatus 16. Conduit 18 is connected to chemical mixing apparatus 16 and extends to an external opening (not shown) below the water line of the side of the boat so that it communicates with the overboard water. Conduit 19 extends between chemical mixing apparatus 16 and the upper inlet 20 of pump 15. Conduit 21 extends between the upper outlet 22 of pump 12 and the upper portion of waste receptacle 11. Conduit 24 connects the outlet of waste receptacle 11 to the lower inlet of pump 12. Lower outlet 26 communicates through conduit 28 with retention tank 15, and conduit 29 leads from retention tank to an overboard outlet (not shown), and functions to carry the waste from marine commode system 10 and discharge the waste overboard.

Motor 14 is electrically connected to the electrical system of the boat, and mechanically connected to double-acting piston 30 and functions to drive pumping chambers of the pump. Pump 12 is a self-priming double-acting piston pump and its upper chamber creates suction through conduits 18 and 19 and chemical mixing apparatus 16, and creates pressure through conduit 21, to induce the water to flow from outside the boat to the waste receptacle. The lower chamber of pump 12 creates a suction through conduits 24 and 25 and the lower portion of waste receptacle 11, and creates pressure through conduit 28 and retention tank 15 to cause the material in waste receptacle 11 to flow overboard. While pump 12 has been specifically set forth, various other piston and centrifugal pumps can be used.

Conduit 28 extending from outlet 26 of pump 12 is connected to macerator basket or colander 31 of retention tank 15, and grinder 32 extends downwardly into basket 31 and is driven by motor 34. The openings 35 in basket 31 are approximately one-sixteenth inch in diameter and the waste passing through basket 31 must be approximately this dimension to pass from basket 31 into the remaining area of tank 15. Tank 15 is divided into sections by dividing wall 36 and its check valve 38, and by baffles 39 and 40. With this arrangement the fluids flowing through retention tank 15 will flow progressively through the tank.

As is best shown in FIG. 2, chemical mixing apparatus 16 comprises housing 42 which includes lower chamber 44, liquid supply chamber 45, and chemical stick container 46. Lower chamber 44 includes concave bottom wall 48, and cylindrical sidewall 49. Support flange 50 surrounds the lower portion of lower chamber 44 and exhaust tube 51 extends laterally through concave bottom wall 48 and support flange 50.

Liquid supply chamber 45 is located above lower chamber 44 and is divided from lower chamber 44 by means of partition wall 52 and cylindrical wall 54 of chemical stick container 26. Liquid supply tube 55 opens through cylindrical sidewall 29 into liquid supply chamber 45.

Figure 4:
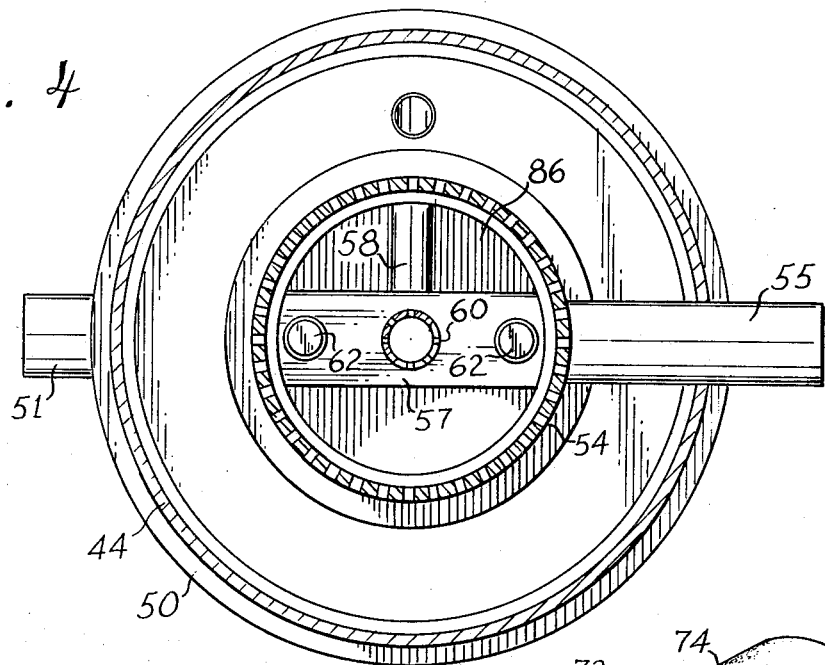
FIG. 4 is a cross-sectional view of the chemical mixing apparatus, taken along lines 4—4 of FIG. 2.

Chemical stick container 46 is open at both of its ends and includes cylindrical sidewall 54 which is inwardly tapered at 56 before it joins to partition wall 52. U-shaped support yoke 57 extends downwardly from cylindrical sidewall 54 into lower chamber 44. As is shown in FIGS. 2 and 3, internal liquid supply conduit 58 leads from liquid supply chamber 45, through lower chamber 44 to support yoke 57. A threaded socket 59 is formed in support yoke 57 and hollow positioning rod 60 is threaded into socket 59. Positioning rod 60 extends upwardly from support yoke 57 in a concentric relationship with upper end of positioning rod 60. A pair of chemical stick supports 62 extend in an upward direction into chemical stick container 46. A series of spaced apertures 63 are defined in the cylindrical sidewall 54 of chemical stick container 46, and as is shown in FIG. 4, extend entirely around cylindrical sidewall 54. Apertures 63 slope in a downward direction into the lower portion of chemical stick container 46.

Positioning rod 60 is tubular and a series of apertures 66 is defined in positioning rod 60 at a level approximately even with apertures 63 of container 46. Chemical stick retaining pin 64 extends through the lower end of positioning rod 60 and dam 68 is located internally of tubular positioning rod 60, above apertures 66. Cap 61 is positionable over chemical stick container 46, to close the upper end of container 46. Cap 61 includes annular groove 69 which receives sealing ring 70 which engages and seals to the upper outer edge of cylindrical side wall 54 of container 46. Thus, cap 61 functions to seal the upper end of chemical stick container 46 and to positively position the upper portion of positioning rod 60 within container 46.

Figure 5:
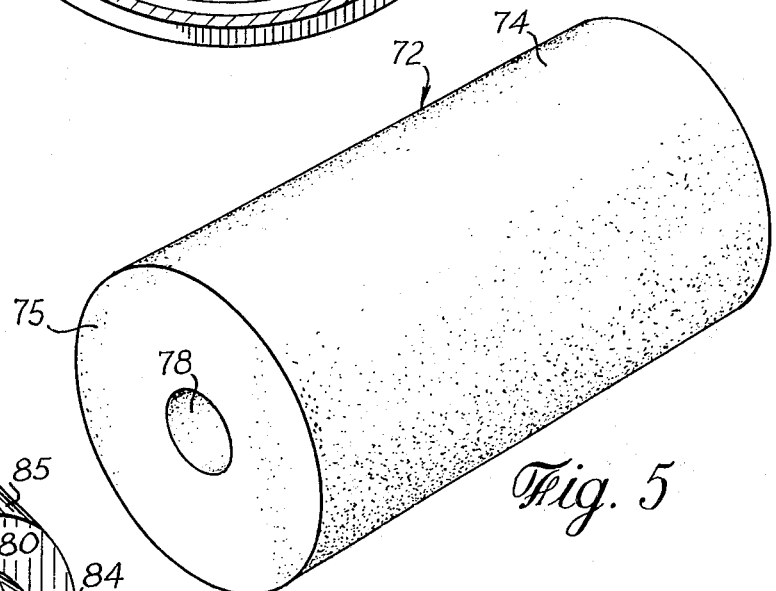
FIG. 5 is a perspective view of a chemical stick which is usable with the chemical mixing apparatus of FIGS. 2—4.
Figure 6:
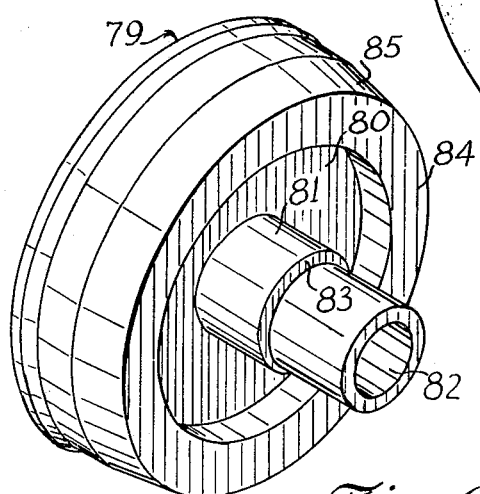
FIG. 6 is a perspective view of the valve element of the chemical mixing apparatus.

As is best shown in FIGS. 2 and 5, chemical stick 72 is of elongated annular configuration, and includes cylindrical outer surface 74, bottom surface 75, top surface 76, and bore 78 extends entirely through chemical stick 72 along its longitudinal axis. Thus, bore 78 is concentric with the cylindrical outer surface 74 of chemical stick 72. As is shown in FIG. 2, chemical stick 72 is positionable within chemical stick container 46, so that its cylindrical outer surface 74 is spaced away from the inside surface of cylindrical wall 54 of container 46, and bore 78 surrounds positioning rod 60.

Weighted valve element 79 is located within chemical stick container 46, and rests on the top surface 76 of chemical stick 72. Valve element 79 is generally of annular configuration and defines body portion 80, central sleeve 81 which defines opening 82, and downwardly extending peripheral flange 84. Sleeve 81 is stepped at 83, and the smaller diameter of sleeve 81 is sized to fit the bore 78 of chemical stick 72, while the larger portion of sleeve 81 rests on top of stick 72. Peripheral flange 84 is inwardly tapered at 85, and taper 85 matches the angle of taper 56 of chemical stick container 42.

Valve element 79 is of a diameter slightly smaller than the internal diameter of cylindrical sidewall 54 of chemical stick container 46, and opening 81 is of a diameter slightly larger than the outside diameter of tubular positioning rod 60. Thus, valve element 79 is slidable in upward and downward directions within chemical stick container 46, about positioning rod 60. When valve element 79 moves toward the bottom of container 46, it will pass over and then beyond apertures 63 of container 46 and openings 66 of positioning rod 60 until its tapered portion 85 engages the tapered portion 56 of container 46. Thus, apertures 63 and openings 66 will be blocked from lower chamber 44, and liquid supply chamber will no longer communicate with lower chamber 44.

As is best shown in FIG. 2, baffle 86 is positioned within lower chamber 44, above exhaust tube 51 and below chemical stick container 46. Baffle 86 is generally disc-shaped and defines a series of equally spaced apertures 88 at its edge. Baffle 86 is supported from yoke 57 by threaded plug 89. Thus, baffle 86 is suspended within the central portion of lower chamber 44, directly beneath the lower opening of the chemical stick container.

OPERATIONS

When marine commode system 10 is to be utilized, a chemical stick 72 is inserted into chemical mixing apparatus 16 by removing cap 61, positioning rod 60, and valve element 79 from stick container 46, removing retaining pin 64 from positioning rod 60, and inserting a chemical stick 72 onto positioning rod 60. Retaining pin is then reinserted into positioning rod 60 to hold chemical stick 72 and valve element 79 in place. Chemical stick 72, valve element 79, and positioning rod 60 are then lowered into chemical stick container 46, until the threads of the lower end of positioning rod 60 engage the threads of yoke 57, whereupon cap 61 is rotated until cap 61 seals to the upper edge of container 46. Thus, cap 61 hermetically seals container 46. At this point, marine commode system 10 is ready for operation.

When marine commode system 10 is to be flushed, an electrical circuit (not shown) is made to motors 14 and 34, which drive pump 15 and grinder 32. Pump 12 functions to draw a vacuum within chemical mixing apparatus 16, to create a flow through conduit 18 from outside the boat, through liquid supply tube 55 and into liquid supply chamber 45 of chemical mixing apparatus 16. The water drawn onto liquid supply chamber 45 passes through internal liquid supply conduit 58 and up into the lower portion of positioning rod 60, and flows through apertures 66 of positioning rod 60 in the form of jetstreams. Also, the water passes from liquid supply chamber 45 through apertures 63 in cylindrical wall 54 of stick container 46 in a similar manner. The water impinges upon the lower portion of chemical stick 72, on both its inner and outer surfaces and erodes the chemical stick so that a portion of the chemical compound is carried away with the water. After the water impinges upon chemical stick 72, it falls through the bottom opening of chemical stick container 46, into lower chamber 44. Because of the low pressure drawn by pump 12, there may be a hazard of froth and foam being created within lower chamber 44. Baffle 86 functions to inhibit the development of foam, to leave chamber 44 relatively foam free. Thus, the air within chemical mixer 16 will not pass with the foam through the system.

As the mixture of water and chemical fall into lower chamber 44, the concave shape of bottom wall 48 moves the mixture to the center of bottom wall 48, where the inlet of exhaust tube 51 is placed. Thus, the suction from pump 12 is felt at the lower central area of lower chamber 44, assuring that primarily only foam-free liquid is exhausted from lower chamber 44, and also that the roll and pitch of the boat is not effective in exposing the opening of exhaust tube 51 to the gases in the system.

As the mixture leaves chemical mixing apparatus 16, it enters pump 12 where it is pressurized and moved through conduit 21 into the upper portion of waste receptacle 11. The mixture then functions as a purging liquid, to purge waste receptacle 11 of the waste deposited therein. In the meantime, the lower pumping chamber of pump 12 functions to withdraw the purging liquid and waste from waste receptacle 11 and urge it into retention tank 15. Grinder 32 is driven by motor 34, and functions to comminute or macerate the waste into particles sizes not larger than one-sixteenth of an inch in diameter as the waste and liquid pass from basket 31 through its openings 35 into the chambers of retention tank 15. The chemical composition added to the water by chemical mixer 16 has ample time to purify the waste while in retention tank 15.

As is shown in FIG. 2, as the water passes through apertures 63 and 66 in cylindrical sidewall 54 of stick container 46 and in positioning rod 60, respectively, the lower end of chemical stick 72 becomes tapered, and the erosion of chemical stick 72 takes place from both of its inside and outside surfaces and at a downward angle about its outer surface. Thus, maximum water contact is made with chemical stick 72. As the lower end of chemical stick 72 dissipates, weighted valve element 79 and the weight of chemical stick 72 both function to urge the chemical stick in a downward direction within stick container 46 and about positioning rod 60. Of course, chemical stick supports 62 always function to support chemical stick 72 in a position so that its bottom end is properly located with respect to apertures 63 and 66.

As chemical stick 72 is dissipated, valve element 79 approaches apertures 63 and 66. In the event that a chemical stick is not replaced before it is completely dissipated, valve element 79 will drop to a level below apertures 63 and 66, to completely block communication between apertures 63 and 66, and lower chamber 44, which blocks the flow of water from liquid supply chamber 45 to lower chamber 44. Thus, the flow of water through chemical mixing apparatus 16 and to pump 12 will be terminated, and when marine commode system 10 is activated by the closing of a switch, motor 14 will function as usual, but no purging liquid will be provided. The disposing function of marine commode system 10 will not take place until the operator places another chemical stick 72 in chemical mixing apparatus 16. With this arrangement, marine commode system 10 will not function to pollute or contaminate the water adjacent the boat when chemical stick 72 has been completely eroded or dissipated, and the operator will be reminded to insert another chemical stick in the system.

While the operation of motor 14 and pump 12 functions to draw water through chemical mixing apparatus 16, it will be understood that motor 14 is inactive during a majority of the time and is activated only when the purging function is desired. The arrangement of chemical mixing apparatus 16 is such that water is drawn through the apparatus and forced into impinging contact with chemical stick 72 only during the times when marine commode system 10 is activated. Thus, chemical stick 72 will remain substantially dry during a majority of the time, and will never be immersed in water. With this arrangement, this dissipation of chemical stick 72 will not take place except during a purging cycle, and because of its increased area of contact of the water contacting both the outside and inside surfaces of the chemical stick, a comparatively high concentration of chemical compound can be eroded or dissipated from chemical stick during the purging operation to assure sufficient decontamination or purification of the waste removed from waste receptacle 11. Thus, chemical mixing apparatus 16 is highly effective during the operation of marine commode system 10, and is completely dormant when the commode system is not in use.

Since the chemical composition utilized with chemical mixing apparatus 16 is in solidified form, a new supply of the chemical compound can be safely and expediently placed in chemical mixing apparatus 16 by the most inept and unknowledgeable operator, without danger of spilling the chemical or damaging the apparatus. Furthermore, in most instances the cylindrical side wall of chemical stick container 46 will be fabricated of polycarbonate or a similar transparent material, so that an instantaneous visual inspection of the amount of chemical stick remaining within stick container 46 can be made.

It will be obvious to those skilled in the art that many variations may be made in the embodiments chosen for the purpose of illustrating the present invention without departing from the scope thereof as defined by the appended claims.

We claim:

1. In waste treatment apparatus comprising a waste receptacle, pump means including an inlet communicating with a source of liquid and an outlet communicating with said waste receptacle, and grinding means including an inlet communicating with said waste receptacle and an outlet, the combination therewith of chemical mixing apparatus connected between the inlet of said pump and the source of liquid, said chemical mixing apparatus comprising a container for storing a solid body of soluble chemical composition, first duct means communicating said container with the source of liquid, and second duct means communicating said container with the inlet of said pump means.

2. The invention of claim 1 wherein said container is shaped to receive a stick of chemical compound and said first duct means is constructed to direct liquid toward the lower end of a solid body of chemical composition positioned in said container.

3. Apparatus for mixing a chemical with a liquid comprising a container for receiving a body of soluble chemical composition, said container defining a plurality of openings at its lower end which communicate with the interior of the container; a liquid supply duct communicating with said plurality of openings from outside said container; valve means for controlling communication between the interior of the container and the liquid supply duct, said valve means being responsive to the presence or absence of chemical composition in said container and comprising a valve member moveable in a vertical direction within said container for placement on top of the body of soluble chemical composition, whereby dissipation of the body of soluble chemical composition results in said valve member moving in a downward direction to block said plurality of openings; and vacuum pump means including an inlet communicating with said container for creating a reduced pressure within said container and for inducing a flow of liquid from said supply duct, through said openings, and into contact with the body of soluble chemical composition.

4. The invention of claim 3 wherein said container is open at its lower end and chemical support means are positioned at said lower end, said vacuum pump means communicates with said container through its open lower end, and said plurality of openings are positioned above the level of said chemical support means.

5. The invention of claim 3 wherein said container is tubular shaped with its longitudinal axis extending in an upward direction, conduit means communicating with said liquid supply duct and terminating in a nozzle means at the longitudinal axis of the container at the lower end of the container, and central support means extends upwardly from said nozzle means through at least a major portion of the length of said container.

6. Chemical mixing apparatus comprising a tubular container positioned in an upright altitude for receiving a stick of soluble chemical composition, a series of apertures defined in the lower end of said container, inlet duct means for supplying liquid to said apertures from outside said container, outlet duct means communicating with the lower portion of said container, support means for supporting a stick of soluble chemical composition within said container, and valve means for closing said inlet duct means in response to the dissipation of a stick of soluble chemical composition in said container, said valve means comprising a valve element having a surface corresponding in size and shape to the interior size and shape of said container and moveable along the length of said container, whereby said valve element is positioned on top of a stick of chemical composition and moves downwardly within said container as the stick of chemical composition dissipates until the valve element blocks said series of apertures.

7. The invention of claim 6 wherein at least a portion of said series of apertures are defined in the exterior wall of said container.

8. The invention of claim 6 wherein at least a portion of said series of apertures are disposed at the central portion of the bottom of the container.